(12) United States Patent
Sobolewski

(10) Patent No.: US 9,428,244 B2
(45) Date of Patent: Aug. 30, 2016

(54) MANUALLY POWERED VEHICLE

(71) Applicant: TORQWAY Sp. z o.o., Toruń (PL)

(72) Inventor: Andrzej Sobolewski, Toruń (PL)

(73) Assignee: TORQWAY Sp. z o.o., Toruń (PL)

( * ) Notice: Subject to any disclaimer, the term of this patent is extended or adjusted under 35 U.S.C. 154(b) by 17 days.

(21) Appl. No.: 14/353,197

(22) PCT Filed: Oct. 23, 2012

(86) PCT No.: PCT/PL2012/000111
§ 371 (c)(1),
(2) Date: Apr. 21, 2014

(87) PCT Pub. No.: WO2013/062429
PCT Pub. Date: May 2, 2013

(65) Prior Publication Data
US 2014/0246840 A1 Sep. 4, 2014

(30) Foreign Application Priority Data

Oct. 25, 2011 (PL) .......................... 396764

(51) Int. Cl.
| | | |
|---|---|---|
| *B62M 1/14* | (2006.01) | |
| *B62M 1/16* | (2006.01) | |
| *B62M 1/24* | (2013.01) | |
| *B62M 1/30* | (2013.01) | |
| *B62K 3/00* | (2006.01) | |
| *B62K 5/00* | (2013.01) | |

(52) U.S. Cl.
CPC ................. *B62M 1/30* (2013.01); *B62M 1/14* (2013.01); *B62M 1/16* (2013.01); *B62M 1/24* (2013.01); *B62K 3/002* (2013.01); *B62K 5/00* (2013.01)

(58) Field of Classification Search
CPC .......... B62M 1/14; B62M 1/16; B62M 1/24; B62M 1/30; B62K 3/002; B62K 5/00
See application file for complete search history.

(56) References Cited

U.S. PATENT DOCUMENTS

| 504,685 A * | 9/1893 | Steel ............................ 280/240 |
| 577,572 A | 2/1897 | Cross |
| 1,443,904 A | 1/1923 | Parsons |

(Continued)

FOREIGN PATENT DOCUMENTS

WO 20060059003 A1 6/2006

OTHER PUBLICATIONS

International Search Report dated Jun. 3, 2013, as issued in corresponding International Patent Application No. PCT/PL2012/000111.

*Primary Examiner* — Joseph Rocca
*Assistant Examiner* — Maurice Williams
(74) *Attorney, Agent, or Firm* — Maier & Maier, PLLC

(57) ABSTRACT

A manually-powered vehicle propelled by muscular force, whose user maintains a standing position, and whose drive is hand-held. The vehicle according to the invention includes two drive wheels, with independent mechanisms installed inside them, which transform the swinging motion of the levers into unidirectional gyration of the drive wheels axis thus driving the vehicle forward, at least one neutral wheel mounted in a way allowing rotation around the vertical axis, and where a low-slung platform is attached directly to the casing of the mechanisms.

5 Claims, 2 Drawing Sheets

(56) References Cited

U.S. PATENT DOCUMENTS

Figure 1:
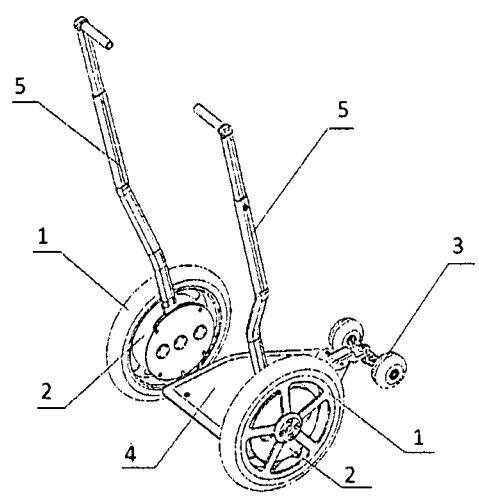

| | | | |
|---|---|---|---|
| 1,571,562 A * | 2/1926 | Tingley | 280/257 |
| 1,613,356 A * | 1/1927 | Norrish | 280/237 |
| 1,862,013 A * | 6/1932 | Godoy | 280/240 |
| 2,086,445 A * | 7/1937 | Smith | 280/221 |
| 3,870,334 A * | 3/1975 | Cole | 280/87.01 |
| 5,716,069 A * | 2/1998 | Bezerra et al. | 280/254 |
| 5,826,897 A | 10/1998 | Beard | |
| 6,007,082 A * | 12/1999 | Watwood et al. | 280/244 |
| 6,352,274 B1 | 3/2002 | Redman | |
| 6,708,997 B2 | 3/2004 | Chait | |
| 6,755,430 B1 * | 6/2004 | Watwood et al. | 280/250.1 |
| 6,942,234 B1 | 9/2005 | Chait | |
| 8,336,897 B2 * | 12/2012 | Leslie | 280/244 |
| 2004/0050195 A1 * | 3/2004 | Lai | 74/344 |
| 2004/0212177 A1 | 10/2004 | Kuiken | |
| 2007/0290477 A1 * | 12/2007 | Lee | 280/242.1 |
| 2008/0238022 A1 | 10/2008 | Kylstra | |
| 2008/0252036 A1 | 10/2008 | Smurthwaite | |
| 2014/0260725 A1 * | 9/2014 | Weber | 74/89.13 |

* cited by examiner

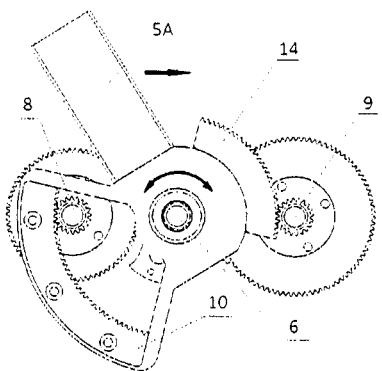
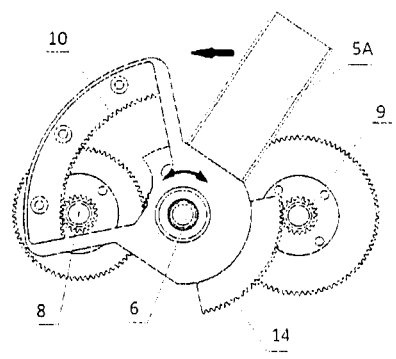
Fig. 3              Fig. 3a
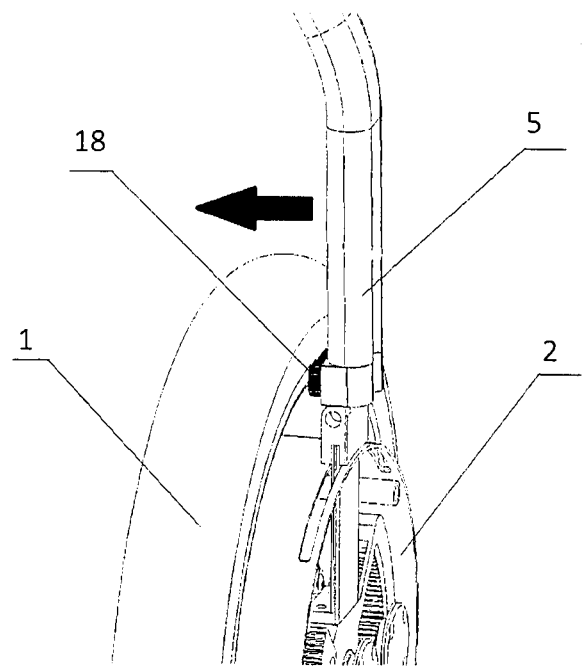
Fig. 4

MANUALLY POWERED VEHICLE

The present invention is a manually powered vehicle, containing at least two wheels, whose user maintains a standing position, with his/her hands on relevant levers. Movement of the levers sets the vehicle in motion.

Manually powered vehicles have been known for a very long time. Widely known and commonly available worldwide are devices powered by foot power such as bicycles, scooters or skateboards. The temptation to use hand muscles to power all sorts of vehicles, including flying machines, has been with us for centuries. A vehicle called a railway trolley has been known and used for many years; being a vehicle powered solely by the force of arm muscles, however its use is limited to moving along railway tracks. For years patent databases worldwide have been accumulating numerous patent applications concerning use of this type of a drive in commonly used vehicles; however, none of the solutions proposed there has become as prevalent as a bicycle. The earliest ideas submitted in this field date back to the turn of $19^{th}$ century.

A trolley type four wheel vehicle, disclosed in: U.S. Pat. No. 577,572 from 1897, is driven by a system of levers, cogwheels and toothed bars, powering the back wheels axis via an eccentric mechanism.

A trolley type three wheel vehicle, disclosed in: U.S. Pat. No. 1,443,904 from 1923, is driven by a lever powering the back wheel axis via a ratchet mechanism.

Also recently, numerous inventions have been submitted in this field.

A trolley type three wheel vehicle, disclosed in: U.S. Pat. No. 5,826,897, is driven by a lever power chain system, which power the device's back axis through a unidirectional clutch.

A trolley type three wheel vehicle, disclosed in: U.S. Pat. No. 6,352,274, is driven by a lever and power chain system powering back wheels.

In three wheel devices driven by a muscular force of arms, disclosed in: U.S. Pat. No. 6,708,997 and U.S. Pat. No. 6,942,234, a rear wheel is powered by a set of cogwheels and toothed bars, together with a system of levers pushed alternately in a forced manner.

Similarly to the present invention, all above ideas concern construction of a device enabling a man to move using hand muscle power. A common feature of most of these devices is a high degree of the driving mechanisms complexity or forcing the way of propulsion using alternating arms movement, and this certainly contributed to the low prevalence of this type of vehicles.

Hand-powered vehicle according to the present invention, provided with at least two wheels, a pair of levers and a platform allowing the user to maintain a standing position, is characterized in that it contains two drive wheels, with independent mechanisms installed inside each of them, transforming the swinging motion of the lever into unidirectional gyration of the drive wheels' axis, with at least one driven wheel mounted in a way allowing rotation around the vertical axis, and wherein a low-slung platform is attached directly to the mechanism casing.

Each of the mechanisms installed in both drive wheels contains a central axis, on which two cogwheels are mounted, equipped with unidirectional clutches, a collar moved by a lever, with a pair of cogwheels attached to it, first external axis with two cogwheels installed on it and second external axis with two cogwheels installed on it. All components installed in the mechanisms are interlocked in such a way that when a cogwheel with internal teeth, fixed to the collar propelled by a lever, drives the first cogwheel attached to the first external axis and then via the second cogwheel attached to this axis, drives the first cogwheel attached to the central axis, the second externally toothed cogwheel attached to the same collar drives the first cogwheel attached to the second external axis and through the second wheel attached to this axis, respectively, drives the second cogwheel attached to the central axis. Due to this coupling both cogwheels mounted on the central axis always rotate in opposite directions, which means that when one of those wheels, using the operating principle of the unidirectional clutch on which it is mounted, forwards the drive from the manually powered lever to the mechanism's central axis and then to the drive wheel, the other wheel rotates freely. In the lower parts of the levers driving the vehicle, components of a braking system are arranged, and brake pads in particular, in a way enabling pushing them against the inner sides of the drive wheels rims.

Use of the vehicle according to the present invention is intuitive and does not require any special preparation and training. The vehicle according to the present invention allows comfortable movement for persons of any age, provided they have not lost the ability to stand upright; therefore it is suitable especially for elderly people, enabling them to achieve a high degree of mobility. Younger, more athletic people may perceive this vehicle as an alternative to a bicycle, a scooter or a skate-board. The vehicle according to the present invention is stopped by tilting the lever in the direction of the drive wheels, which will cause the brake pads to push into the rims of said wheels. The vehicle according to the present invention is maneuvered with the same levers which are used for a drive by "braking" left and right wheel respectively or by accelerating the drive of the wheel which is not currently being braked, or by applying those two principles together.

The vehicle propulsion method requires some degree of physical activity, which, combined with the possibility of long distance rides, offers unique recreational opportunities and allows using the vehicle as a training device for development of the user's upper muscle groups. Using hands and chest muscles to power a commonly used vehicle could have a positive impact on the users' overall health, as due to the current lifestyle those specific groups of muscles are usually the least used. Its small dimensions, low weight achieved through use of modern materials and easy dismantling of the individual components facilitate easy transport of the vehicle, for example, in a car trunk or in a special backpack. The vehicle according to the present invention can be widely used as a sports and recreation vehicle in tourist centers, on cycling paths in the cities and as a transport device in large area constructions such as airports, warehouses or shopping malls. The mass use of the vehicle could serve as promotion of a healthy lifestyle.

Figure 1A:
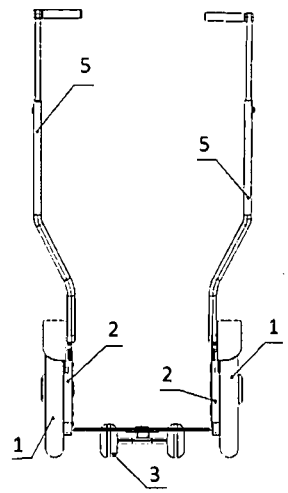
Figure 2:
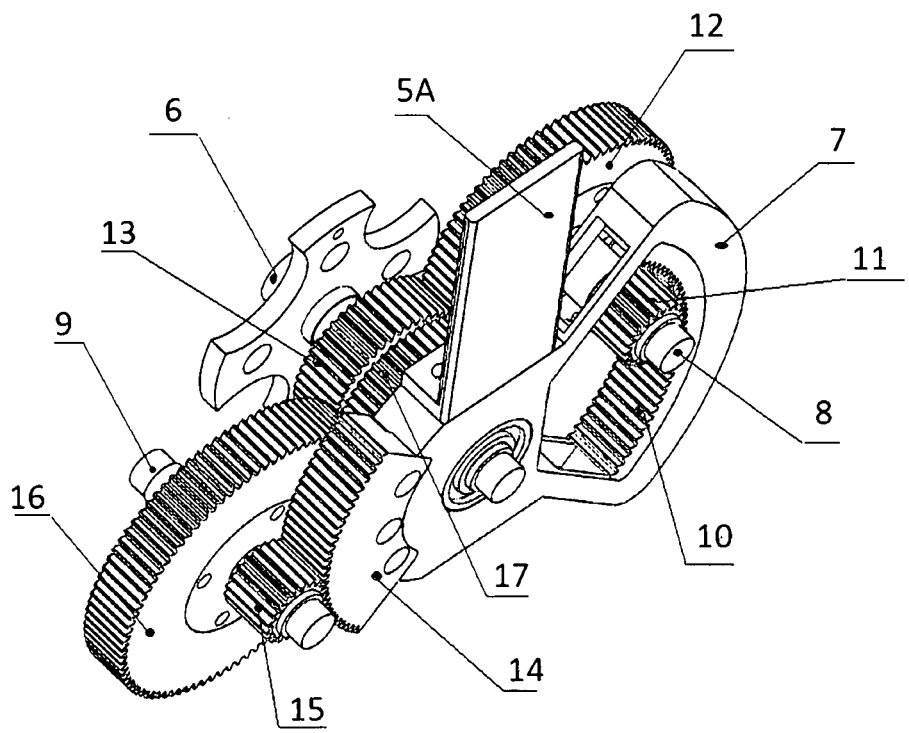

The subject of the invention is visualized in the embodiment example, in the drawings where FIG. 1—shows a general axonometric view of the vehicle, FIG. 1a—shows the vehicle front view, FIG. 2—axonometric projection of the drive mechanism, FIG. 3 and FIG. 3a—the view of the drive mechanism in two opposite positions of the lever, while FIG. 4—components of the braking and maneuvering system.

The vehicle according to the present invention visualized in the present embodiment example in FIG. 1, consists of two drive wheels 1 equipped with independent internal mechanisms 2, which are drove by levers 5, a set of back wheels 3 whose construction allows free rotation around the vertical axis, and a platform 4 mounted directly on the mechanism casings 2, where the said platform 4 can be constructed of any lightweight durable material. A user of the vehicle according to the present invention maintains a standing position on the platform 4, holding in hands appropriate levers 5 used to power the said vehicle. The drive transmission mechanism, shown in axonometric projection in FIG. 2, is installed independently in each drive wheel. Inside each mechanism 2 in the present embodiment there is a toothed gear consisting of three axes, on each axis there are two cogwheels mounted, with varying number of teeth, appropriate selection of which ensures a desired gearing ratio. Additionally, on the central axis 6 there is a collar 7 with a pair of cogwheels attached to it, one of which—internal toothed 10—drives an external axis 8 via the smaller of the cogwheels 11 attached, while the second externally toothed wheel 14 drives the second external axis 9 via a wheel 15 attached to it. A lever handle 5*a* is also attached to the collar 7, with a lever 5 attached to it and used for mechanism's propulsion.

Setting a lever 5 in a swinging motion, in particular, its alternate pulling and pushing, results in a rotary motion of a collar 7 and the wheels 10, 14 installed on it drive corresponding wheels mounted on external axes 8, 9, and then on the cogwheels 13, 17 attached with unidirectional clutches on the central axis 6, which, always turning in opposite directions, operate in such a way that when one of these wheels, using the operating principle of a unidirectional clutch on which it is mounted, transmits the drive from lever 5 moved manually to central axis 6 of the mechanism and then further on to the drive wheel, then the second of those wheels rotates freely. If at any time the user decides to change the direction of the lever 5 movement, the direction of collar 7 rotation is altered together with wheels 10, 14 mounted on it and thus of the cogwheels 13, 17, accordingly. In principle, the drive is achieved by the movement of levers 5 as pictured in FIG. 3 and FIG. 3*a*, showing the view of the mechanism 2 with selected extreme lever 5 positions; however, achieving the said extreme positions is not necessary, so the change in the lever 5 movement direction at any moment will not result in interruption in powering the vehicle. Thus users can use their arms in any manner, for example while the left arm pulls back, the right arm may push forward, and reverse. Both arms may be also used to push or pull together in the same direction, and the movement in each of those directions may be of any length, while remaining within the limits of two extreme positions. User's arm movement in each direction drives the vehicle. In practice this means that the user is not forced to achieve extreme positions of both levers. The vehicle's velocity depends on the gearing applied inside the mechanisms, the frequency of user's arm movements, the lever's length and the power applied when pulling it, as well as on the terrain conditions where the vehicle is used. When the user ceases to use his/her arms, the vehicle will continue to roll until the rolling resistance causes it to stop, while the levers 5 remain stationary. In this embodiment, the vehicle is provided with two independent breaking systems—one in each drive wheel, whose joint use stops the vehicle, while they are used alternately when maneuvering the vehicle. Movements of the lever 5 towards the wheel 1 result in clamping of the brake pads 18 on the inner side surfaces of the drive wheels rims 1, which is illustrated in FIG. 4. While turning the vehicle, the drive wheel 1 not being currently braked can be additionally powered, greatly improving this maneuver.

What is claimed:

1. A hand-powered vehicle having at least two wheels, a pair of levers and a platform allowing the user to maintain a standing position, and comprising:

two drive wheels, wherein independent mechanisms are installed inside each drive wheel, which transform swinging motion of the levers into unidirectional gyration of said drive wheels about drive wheels axes; at least one neutral wheel arranged to rotate around a vertical axis and a low-slung platform that is attached to a casing of said mechanisms; wherein each of the mechanisms installed in both drive wheels contains a central axis on which two cogwheels are mounted, each cogwheel being equipped with a respective unidirectional freewheel clutch; a collar with an internally toothed wheel and externally toothed wheel attached to said collar which are arranged to be set in motion by one of said levers; a first external axis having two cogwheels mounted on the first external axis, and a second external axis having two cogwheels mounted on the second external axis, wherein said two cogwheels equipped with the unidirectional clutch, the collar with the internally toothed wheel and externally toothed wheel attached to said collar, the two cogwheels mounted on the first external axis and the two cogwheels mounted on the second external axis are interlocked together, so when the internally toothed wheel attached to the collar is set in motion by said lever, one of the cogwheels attached to the first external axis is driven and then via the other cogwheel mounted on the first external axis one of the cogwheels attached to said central axis is driven; the externally toothed wheel attached to the same collar drives one of the cogwheels attached to the second external axis, and then via the other cogwheel attached to the second external axis, the other cogwheel attached to said central axis is driven, so that both said cogwheels attached to said central axis rotate in opposite directions;

wherein one of the said cogwheels on said central axis, via the respective unidirectional freewheel clutch, transmits drive from said manually moved lever to said central axis and then further on to said drive wheel, with the other of said cogwheels on said central axis rotating freely.

2. The vehicle according to claim 1 wherein in lower parts of the lever, and brake pads of a braking system are arranged to be pushed against inner sides of drive wheel rims.

3. The vehicle according to claim 1, including a braking system comprising disk brakes, with actuators, which are attached to the drive levers with the brake disks being mounted directly on the drive wheels axes.

4. The vehicle according to claim 1, including a mechanism for tilting of the drive wheels by simultaneously tilting both drive levers accordingly in a desired turning direction.

5. The vehicle according to claim 1, including a mechanism for tilting of the platform along a central axis, which tilting by interacting with a system connected with the drive wheels causes said vehicle to turn.

\* \* \* \* \*